United States Patent [19]

Kikuchi et al.

[11] Patent Number: 4,458,252
[45] Date of Patent: Jul. 3, 1984

[54] MAGNETIC IMAGE RECORDING DEVICE

[75] Inventors: Yohsiki Kikuchi; Takashi Ohmori, both of Kanagawa, Japan

[73] Assignee: Fuji Xerox Co., Ltd., Tokyo, Japan

[21] Appl. No.: 309,343

[22] Filed: Oct. 7, 1981

[30] Foreign Application Priority Data

Oct. 7, 1980 [JP] Japan ................................ 55-139410

[51] Int. Cl.³ .......................................... G01D 15/12
[52] U.S. Cl. ................................................. 346/74.4
[58] Field of Search ..................... 346/74.2, 74.4, 74.6, 346/76 L; 101/DIG. 5; 219/216; 360/59; 358/298, 299, 301; 430/39

[56] References Cited

U.S. PATENT DOCUMENTS 2,915,594 12/1959 Burns, Jr. et al. ..................... 360/59
3,582,570 6/1971 Cushner et al. ....................... 360/59
4,314,257 2/1982 Tokunga et al. ..................... 358/301

OTHER PUBLICATIONS

Kurtzig et al., Reorientation and Curie Point Writing in Orthoferrites, *J. of Applied Physics*, Mar. 15, 1971, pp. 1804-1805, 360/59.

Huth, Calculations of Stable Domain Radii Produced by Thermomagnetic Writing, *IBM J. Res. Develop.*, Aug. 8, 1973, pp. 100-109, 360/59.

*Primary Examiner*—Thomas H. Tarcza
*Attorney, Agent, or Firm*—Sughrue, Mion, Zinn, Macpeak & Seas

[57] ABSTRACT

In a magnetic image recording device, selected portions of a magnetized magnetic medium are heated to temperatures less than the Curie temperature of the medium to reduce the local magnetization intensity and form a magnetic latent image. If desired, the temperatures of different portions can be varied to produce a shaded image.

7 Claims, 2 Drawing Figures

MAGNETIC IMAGE RECORDING DEVICE

BACKGROUND OF THE INVENTION

This invention relates to magnetic image recording devices in which a magnetic latent image is formed on a magnetic medium, and in particular to a magnetic image recording device in which desired portions (recording portions or non-recording portions) of a magnetic medium having a uniform magnetization pattern are selectively heated so that the heated portions are different in the intensity of magnetization from the remaining portions, whereby the magnetic latent image of an image to be recorded is formed on the magnetic medium.

In conventional magnetic image recording devices, in order to write data on the magnetic medium, the polarity of magnetization in a desired portion of a uniformly magnetized magnetic medium is inverted with a magnetic head. This is described, for example, in related copending applications 235,366 filed Feb. 19, 1981 and 309,135, filed on Oct. 6, 1981 and corresponding of Japanese application 55-139411.

Accordingly, in order to write data at a density of about ten pieces/mm for every line, it is necessary to employ about 1,000 to 2,000 magnetic heads. However, manufacturing a magnetic head assembly having such a high density is considerably difficult.

There is a known device in which a laser beam is used to heat a magnetic medium to temperatures higher than its Curie temperature (or a magnetic compensation temperature depending on the material) to invert the polarity of magnetization of magnetic medium and thereby write data. In general, Curie temperatures are relatively high and this device is therefore disadvantageous in that a large quantity of energy is required for heating the magnetic medium, resulting in high operating costs.

Such a data writing method may be applied to a magnetic image recording operation, wherein toner particles are made to stick to the medium in accordance with the magnetization polarity of different portions of the medium. However, since it is difficult to cause magnetic toner to stick onto demagnetized portions of the magnetic medium, the resultant image is not reproduced with high fidelity; i.e., the density of the image is not uniform.

SUMMARY OF THE INVENTION

Accordingly, an object of this invention is to improve the construction of a conventional magnetic image recording device to eliminate the above-described drawbacks. More specifically, an object of this invention is to provide a magnetic image recording device in which the intensities of magnetization of local portions of a magnetic medium are varied with simple means such as a heat generating means which generates heat with relatively low energy, to thereby form a magnetic latent image.

In order to achieve the above-described object, the magnetic medium in this invention is locally heated with a heat generating head, in areas the size of picture elements, according to input data to thereby write data. The applied heat locally varies the intensity of magnetization of the medium, whereby a magnetic latent image is formed in correspondence to the input data. If desired, the temperatures of various local portions can be varied to produce a shaded image.

BRIEF DESCRIPTION OF THE DRAWINGS

The invention will be more clearly understood from the following description in conjunction with the accompanying drawings, in which.

DETAILED DESCRIPTION OF THE PREFERRED EMBODIMENTS

Figure 1:
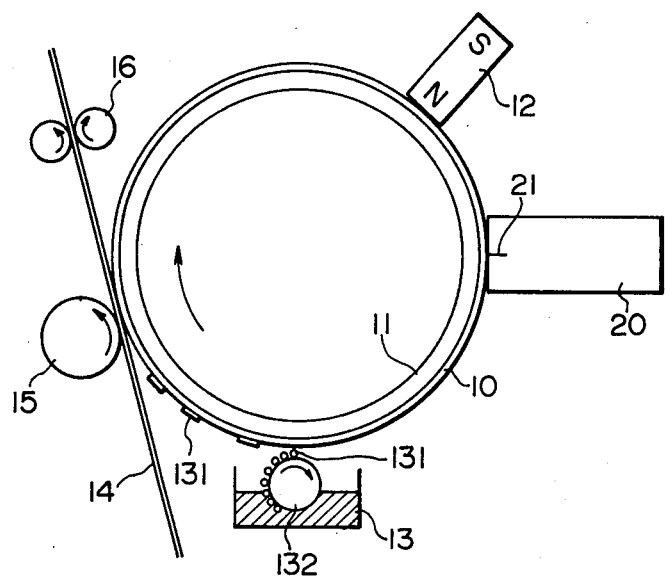
FIG. 1 is a schematic diagram showing one example of a magnetic image recording device according to this invention.

This invention will now be described with reference to the accompanying drawings. FIG. 1 is a schematic diagram showing one example of a magnetic image recording device according to this invention. In FIG. 1, reference numeral 10 designates a magnetic medium; 11, a support (which is a drum in this example); 12, a magnet for magnetizing the magnetic medium uniformly in one direction; 13, a developing unit; 131, magnetic toner; 132, a sticking roll for sticking the magnetic toner 131 onto the magnetic medium 10; 14, a recording sheet; 15 a transfer roll; 16, fixing roll; 20, a heat generating head; and 21, a heat generating element.

Figure 2:
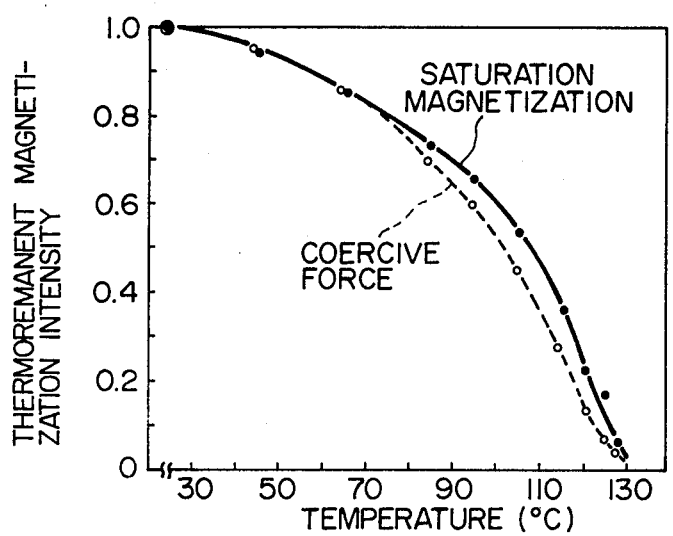
FIG. 2 is a graphical representation indicating the relationship between heating temperature and magnetization intensity.

FIG. 2 is a graphical representation indicating variations in intensities of magnetization of the magnetic medium 10 with heating temperatures of the heat generating element 21 in the case where the magnetic medium 10 is made of $CrO_2$ having a Curie temperature of approximately 130° C. As is apparent from FIG. 2, the magnetization is decreased with increasing heating temperature and is eliminated at the Curie point.

A magnetic image recording operation is carried out with the above-described magnetic image recording device as follows:

The magnetic medium 10 is formed on the support 11 by a coating method or the like. The magnet 12 is positioned so that the magnetic medium 10 is magnetized uniformly in one direction (e.g. the S pole is formed in the outer surface of the magnetic medium which confronts the N pole of the magnet).

The heat generating head 20 is so positioned that its heat generating element 21 is in close contact with the magnetic medium 10. In writing image data in the magnetic medium 10, first the heat generating element 21 of the heat generating head 20 is caused to generate heat in correspondence to the image data, so that the corresponding portions of the magnetic medium 10 are heated to temperature lower than the Curie point.

As a result, the intensities of magnetization of the portions of the magnetic medium 10 are decreased in correspondence to the increased temperatures according to the magnetization-temperature characteristic shown in FIG. 2. These decreased intensities of magnetization will be maintained even when the temperature of the medium subsequently is decreased to room temperature.

As the temperature of the remaining portions of the magnetic medium 10 are not increased, the intensities of magnetization thereof are not altered; that is, the remaining portions have the initial strong intensities of magnetization imparted to them by the magnet 12.

In the next step, the magnetic toner 131 in the developing unit 13 is stuck onto the magnetic medium by the roll 132 in quantities corresponding to the amounts of magnetization.

The magnetic toner 131 stuck onto the surface of the magnetized portions of the magnetic medium is transferred, as the image data, onto the recording sheet 14 by the transfer roll 15. Thereafter, the image is fixed by the fixing roll 16.

In the above-described operation, shading may be given to a reproduced image by employing the following method: The energy applied to the heat generating element of the heat generating head, i.e. the applied voltage and current and the pulse width, can be controlled individually or in combination to selectively apply different heating temperatures to different portions of the magnetic medium 10, so that the magnetization intensities of the writing dots are varied and accordingly the amounts of magnetic toner which adhere thereto are varied. Thus, a shaded image can be reproduced.

While the heat generating means is disclosed as a heat generating head and heat generating element, a laser source could be used as is well known in the art.

EXAMPLE

A chromium dioxide ($CrO_2$) film magnetic tape (CROLYN KC-30 of Dupont Co.) was used as the magnetic medium. After being magnetized uniformly in one of the running directions of the magnetic tape, the magnetic medium was heated selectively according to a video signal while being brought into close contact with the thermal head.

Then, the magnetic toner was applied to the magnetic tape and then transferred onto a recording material, as a result of which an image was obtained. When the voltage applied to the thermal head was set to 22 V in this operation thereby heating selected portions to temperatures above the Curie temperature, the density of the solid portion of the resultant image was not uniform. However, when the applied voltage was decreased to 18 V so that the heating temperature was less than the Curie temperature, such a problem was not encountered and the reproduced image quality was noticeably improved.

As is apparent from the above description, in this invention, the magnetic medium is heated to a temperature lower than the Curie point thereof by the heat generating head for writing data, so that a magnetic pattern is formed according to data to be recorded. Therefore, the invention has significant advantages in that the magnetic image recording device is simple in construction and can perform a magnetic image recording operation with lower energy.

Another advantage of the invention is that, since the amount of energy applied to the heat generating head is small, images can be recorded at high speed.

What is claimed is:

1. In a magnetic image recording device of the type including a magnetic medium, means for magnetizing said magnetic medium uniformly in one direction, heating means for heating selected portions of said magnetic medium in accordance with image data, and means for applying magnetic toner to said magnetic medium to form an image on said magnetic medium, the improvement comprising:
   said heating means heating said selected portions of said magnetic medium to temperatures substantially lower than the Curie temperature of said magnetic medium to thereby reduce the magnetization intensities of said selected portions.

2. A magnetic image recording device according to claim 1, wherein the temperatures to which various selected portions are heated differ in accordance with said image data to produce a shaded image.

3. A magnetic image recording device according to claim 1, wherein said heating means is a heat generating head.

4. A magnetic image recording device according to claim 1, wherein said heating means is a laser source.

5. A copying machine comprising:
   a rotatable drum-shaped support;
   a magnetic medium disposed on an outer surface of said support;
   an initial magnetization unit extending parallel to an axis of rotation of said support, said initial magnetization unit applying a magnetic field to said magnetic medium to uniformly magnetize said magnetic medium in a predetermined direction;
   a thermal recording head disposed adjacent said initial magnetization unit on a side thereof in a direction of rotation of said support, said thermal recording head heating portions of said magnetic medium to a temperature substantially lower than the Curie temperature of said magnetic medium in response to control signals applied thereto, to magnetize said magnetic medium in a pattern representing an image to be copied;
   a developer section comprising a supply of magnetic toner particles and a rotating toner roll for supplying toner particles from said supply to said magnetic medium; and
   means for transferring magnetic toner particles adhering to said magnetic medium to a recording sheets.

6. A copying machine as defined in claim 5, wherein said magnetic medium comprises $CrO2$ and said temperature substantially lower than said Curie temperature is $\leq 110°$ C.

7. A copying machine as defined in claim 6, wherein said temperature substantially lower than said Curie temperature is no more than substantially 85% of said Curie temperature.

* * * * *